United States Patent
Wever et al.

(10) Patent No.: US 7,362,363 B2
(45) Date of Patent: Apr. 22, 2008

(54) SENSOR DEVICE WITH SENSOR ELEMENTS AND READ-OUT UNIT WHICH READS PARTIAL MEASUREMENTS

(75) Inventors: Utz Wever, München (DE); Qinghua Zheng, Taufkirchen (DE)

(73) Assignee: Siemens Aktiengesellschaft, Munich (DE)

(*) Notice: Subject to any disclaimer, the term of this patent is extended or adjusted under 35 U.S.C. 154(b) by 647 days.

(21) Appl. No.: 10/498,221

(22) PCT Filed: Dec. 3, 2002

(86) PCT No.: PCT/DE02/04428

§ 371 (c)(1),
(2), (4) Date: Jun. 10, 2004

(87) PCT Pub. No.: WO03/054483

PCT Pub. Date: Jul. 3, 2003

(65) Prior Publication Data

US 2005/0012028 A1    Jan. 20, 2005

(30) Foreign Application Priority Data

Dec. 10, 2001   (DE) ............... 101 60 527

(51) Int. Cl.
  H04N 3/14  (2006.01)
  H04N 7/12  (2006.01)
  H04N 11/02 (2006.01)
(52) U.S. Cl. ............ 348/294; 348/409.1; 375/240.19
(58) Field of Classification Search ............ 348/14.12, 348/208.1, 208.13, 302, 308, 296, 409.1, 348/437.1, 438.1, 294; 375/240.19, 240.01; 382/299

See application file for complete search history.

(56) References Cited

U.S. PATENT DOCUMENTS

| 5,574,275 A | 11/1996 | Durst et al. |
| 5,905,818 A | 5/1999 | Ni |
| 6,141,455 A | 10/2000 | Matsuzawa et al. |
| 6,255,638 B1 * | 7/2001 | Eraluoto et al. ......... 250/208.1 |

(Continued)

FOREIGN PATENT DOCUMENTS

JP    3494307 B2 *   2/2004

(Continued)

OTHER PUBLICATIONS

B.J. Falkowski et al., Walsh-like Functions and Their Relations; IEE Proc.-Vis. Image Signal Process, vol. 143, No. 5, Oct. 1996; pp. 279-284.

*Primary Examiner*—John M. Villecco
(74) *Attorney, Agent, or Firm*—Staas & Halsey LLP

(57) ABSTRACT

In a sensor arrangement, a number of sensor elements make measurements and a read-out unit reads measurements from the sensor elements. Images should be recorded in such a way that easily compressible representation of the image content is obtained back at the recording stage and an additional processor unit is not required. The read-out unit reads partial measurements from the sensor elements in succession by at least one of adding and subtracting measurements of different sensor elements. By adding or subtracting the measurements of the different sensor elements to obtain the partial measurements, values of basis vectors are obtained for a basis in which the overall measurement can be represented.

12 Claims, 3 Drawing Sheets

U.S. PATENT DOCUMENTS

| | | | |
|---|---|---|---|
| 6,437,338 B1 * | 8/2002 | Hoffman | 250/208.1 |
| 6,753,904 B1 * | 6/2004 | Nomura | 348/208.1 |
| 6,765,960 B1 * | 7/2004 | Schanz et al. | 375/240.01 |
| 6,816,192 B1 * | 11/2004 | Nishikawa | 348/207.1 |
| 6,956,605 B1 * | 10/2005 | Hashimoto | 250/208.1 |
| 2004/0051802 A1 * | 3/2004 | Krymski | 348/308 |

FOREIGN PATENT DOCUMENTS

WO 97/02705 1/1997

* cited by examiner

SENSOR DEVICE WITH SENSOR ELEMENTS AND READ-OUT UNIT WHICH READS PARTIAL MEASUREMENTS

CROSS REFERENCE TO RELATED APPLICATIONS

This application is based on and hereby claims priority to German Application No. 02/04428 filed on Dec. 3, 2002, the contents of which are hereby incorporated by reference.

BACKGROUND OF THE INVENTION

1. Field of the Invention

The invention relates to a sensor device having a number of sensor elements by which measurements can be made, and having a read-out unit for reading out the measurements from the sensor elements. In addition, the invention relates to a method for reading sensor elements.

2. Description of the Related Art

Sensor arrangements having a number of sensor elements are known from electronic cameras for example. In this case an image is projected onto a CCD (charge coupled device) via a lens system. The image is recorded by the CCD based on a measurement.

Owing to the large number of sensor elements on a CCD, the image recorded in this way requires a very large amount of memory and also a very large amount of transmission capacity when transferring the image from the camera for further processing.

Hence it is known in the art to apply a compression technique to the image. Wavelet transformations with subsequent compression have become established in particular for this purpose, because they lead to a very high compression rate and a large part of the image content can still be reconstructed even when only part of the data has been transferred.

The wavelet transformations do not make the memory in the camera obsolete, however, because the image still needs to be stored temporarily prior to the transformation. Furthermore, an additional processor unit is required in order to perform the transformation. This makes the camera more expensive and increases its power consumption.

Hence an object of the invention is to record images in such a way that an easily compressible representation of the image content is obtained back at the recording stage and an additional processor unit is not required.

SUMMARY OF THE INVENTION

According to the present invention, the sensor device has a number of sensor elements by which measurements can be made. In addition, the sensor device has a read-out unit for reading out the measurements from these sensor elements. The sensor device is designed so that to perform an overall measurement, a plurality of partial measurements are made in succession. The term partial measurements refers here to the process in which a plurality of partial measurements are made successively over time that together produce the measurements for the required overall measurement. Thus the partial measurements are each made by involving, at least approximately, the same, in particular all the sensor elements.

The read-out unit is designed in order to switch the reading of the sensor elements in such a way that for the respective partial measurements the measurements of the different sensor elements are each added and subtracted for difference generation. In this way, for each partial measurement, absolute values are no longer measured for the individual sensor elements but just difference values between the measurements of the sensor elements, which are obtained from the combinations of sensor elements defined for each partial measurement. In addition, a different difference is generated in each partial measurement in order to obtain the required information, for example an image, for the overall measurement.

Thus for the sensor arrangement, one starts from the same idea as the wavelet transformation already known in the art for post-processing. In both cases difference values are found primarily by combining image pixels. This is done in the knowledge that in an image the difference between two pixels often vanishes, so that these vanishing differences can together be compressed or left out completely.

Unlike a wavelet transformation performed subsequently, however, in the sensor device the sensor elements are read out immediately by the read-out unit in such a way that the read-out result contains difference values and no absolute values from the outset. This means that a processor for post processing is not required.

It is crucial here, how the read-out unit switches the reading of the sensor elements for the respective partial measurements, that is, how they combine the sensor elements positively and negatively in each case so that one can construct the overall measurement as completely as possible from the results of the partial measurements. In addition, only as few partial measurements as possible are to be made and/or each partial measurement should be made as quickly as possible.

These requirements are met by combining the sensor elements for each partial measurement positively and negatively in such a way that in each case they produce the basis vector of a basis in which the result of the overall measurement can be represented. In this way one obtains no redundant information and thus one only needs a minimum number of measurements, while on the other hand no information is lost.

Preferably the basis is the basis of a wavelet transformation. In particular, this may be the Haar basis because this has proved to be particularly easy to implement in circuit technology.

Alternatively, however, prefactors can also be applied to the measurements of at least some of the sensor elements when adding and subtracting. It is thereby possible, for example, to use the Daubechies and/or the Gabor basis as basis.

The sensor elements are preferably arranged so as to record spatially distributed measurements, in particular an image. This can be done, for example, by arranging the sensor elements in a plane, if one provides an optical system, for example made of lenses, that projects the image to be recorded onto the sensor elements arranged in the plane.

The sensor device can be produced particularly economically if the sensor elements are sensor elements of a CCD.

The number of sensor elements is preferably greater than or equal to 16. For particularly simple switching, the number should be $2^n$, and $4^n$ in the two-dimensional case, where n is a natural number.

The number of partial measurements is greater than or equal to 3, in particular greater than or equal to 5.

For the difference generation, the number of measurements that are added in the partial measurements is at least approximately equal to the number of measurements that are subtracted. Thus a vanishing difference results if no differences in intensity occur in the image.

During the partial measurements, sensor elements and hence the measurements of these sensor elements, are combined in groups in which the measurements of the different sensor elements for the group are each connected together additively and subtractively. The combination of sensor elements into groups is thus advantageous because by selecting a suitable basis, in particular a wavelet basis, the measurements for the individual groups can be de-coupled from each other. This means that the results of the partial measurements are independent of each other for the individual groups, so that the partial measurements can also be performed independently of each other. The result of the overall measurement is no longer dependent on a relationship between the partial measurements.

As already mentioned above, the sensor device is particularly useful where the differences of the added and subtracted measurements of the sensor elements vanish in many cases. If one can perform the partial measurements in a sequence in which the differences must get ever smaller, then the sequence of partial measurements can be terminated when the result of the adding and subtracting, i.e. the difference value, lies below a given threshold value for a partial measurement. One then knows that future measurements will only produce results whose information content is so low that it is no longer of interest.

Often one can specify a sequence of partial measurements in which the differences must get ever smaller, but which cannot be specified in advance. Thus a termination criterion for the sequence of partial measurements that has proved very suitable in practice is to cease further partial measurements once a required resolution is reached. For this purpose it is useful to order the partial measurements such that partial measurements that deliver coarse information, and hence only require a short exposure time, are performed first, while partial measurements that measure detailed information and hence take longer, are performed later or not even performed at all after reaching the required resolution.

The required resolution for which no further partial measurements are performed after it is reached, can in particular be adjustable by the user of the sensor arrangement. Based on this adjustment, the system then determines how many partial measurements are to be performed.

The time required for recording an overall measurement can be significantly reduced by this premature termination of the measurements. This is obviously advantageous in the general case, but particularly so if the object of which the image is to be recorded may be exposed to the radiation required for the recording. This is the case in X-ray photographs, for example, but also for normal recordings of light-sensitive objects. Here the radiation required for the recording can be switched off as soon as the required recording quality is reached.

For the case in which sensor elements are grouped together, the sequence of partial measurements can also be terminated individually for each of the respective groups. This results in a reduction in the memory requirement, because for groups for which differences are no longer generated there is also no need to store these differences.

In a method to read a number of sensor elements by which measurements can be made, a plurality of partial measurements are made in succession using read-out unit for reading out the measurements from the sensor elements in order to perform the overall measurement, where the sensor elements are switched by the read-out unit in such a way that for the respective partial measurements the measurements for different partial measurements from different sensor elements are each added and subtracted.

Advantageous embodiments of the method follow analogously from the advantageous embodiments of the sensor arrangement.

BRIEF DESCRIPTION OF THE DRAWINGS

These and other objects and advantages of the present invention will become more apparent and more readily appreciated from the following description of the exemplary embodiments taken in conjunction with the accompanying drawings of which.

DETAILED DESCRIPTION OF THE PREFERRED EMBODIMENT

Figure 1:
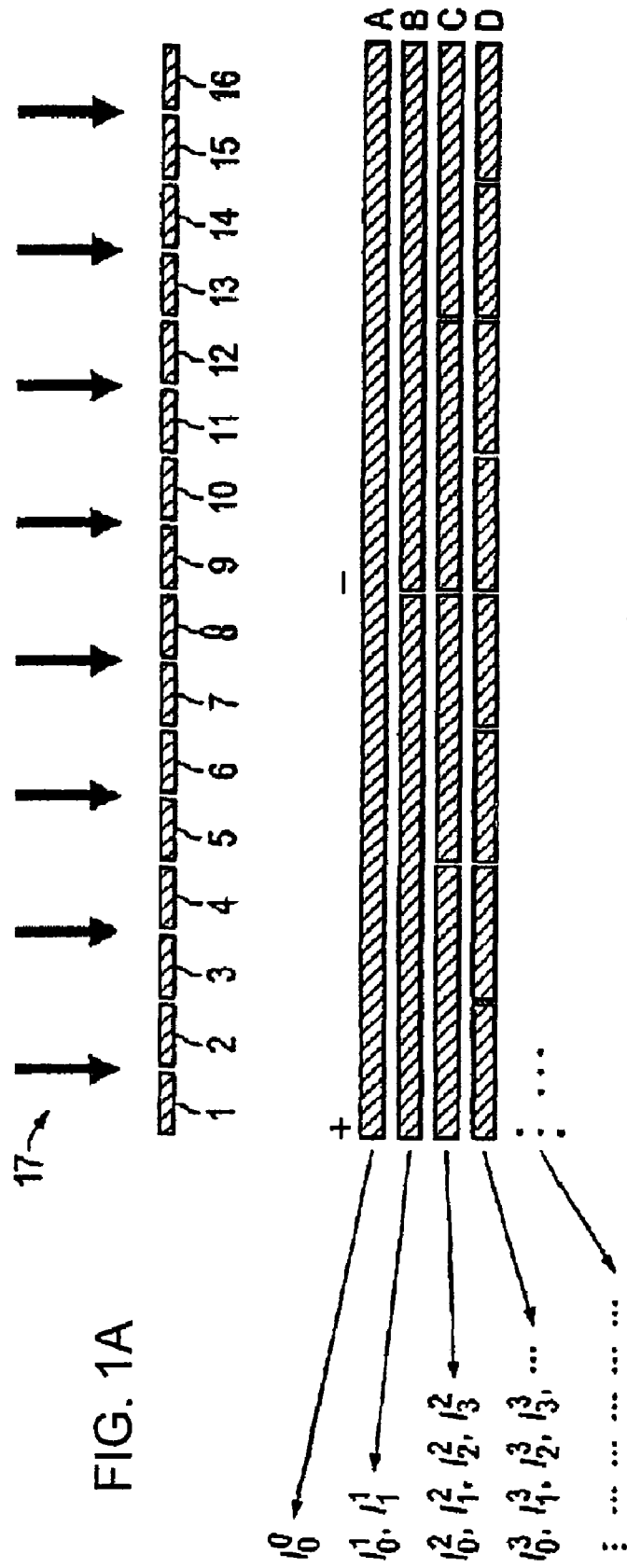
FIG. 1A is a plan view of sensor elements in a one-dimensional sensor arrangement.
FIG. 1B is a switching diagram for the switching of the sensor elements by a read-out unit in different partial measurements.

Reference will now be made in detail to the preferred embodiments of the present invention, examples of which are illustrated in the accompanying drawings, wherein like reference numerals refer to like elements throughout.

FIG. 1A shows a sensor device having sensor elements 1 to 16 arranged one-dimensionally along a line. Although a main application area of the sensor device is in image recording, for which a two-dimensional device of sensor elements in one plane is appropriate, essential aspects of the invention still arise in the one-dimensional case, so this is explained first to simplify understanding.

The sensor elements 1 to 16 are arranged side by side and measure electromagnetic radiation 17 in the form of light falling onto the sensor elements 1 to 16.

Below the sensor elements 1 to 16, FIG. 1B shows schematically how the read-out unit reads the sensor elements 1 to 16 in the partial measurements A to D. In this process, half of the sensor elements are always connected positively, i.e. added; and the other half of the sensor elements connected negatively, i.e. subtracted. In the first partial measurement A, the area of the sensor elements 1 to 16 is divided once in the center. In the exemplary embodiment shown, the measurements of the sensor elements 1 to 8 of the left half are added, and the measurements of the sensor elements 9 to 16 of the right half are subtracted. This is done by connecting the sensor elements in parallel in each of the two halves. In total a single difference value $I_0^0$ is obtained for the partial measurement A.

In the second partial measurement B, the sensor elements 1 to 8 connected positively in partial measurement A, and the sensor elements 9 to 16 connected negatively in partial measurement A, are themselves each divided in the center, so that the measurements belonging to one half of the measurements read out with the same sign in partial measurement A are added, and the measurements belonging to the other half of the measurements read out with the same sign in partial measurement A are subtracted.

In total, two groups are obtained in the second partial measurement B, for each of which its own difference value is generated. This leads to two difference values $I_0^1$ and $I_1^1$.

They result from the adding and subtracting in each group and represent the intensity difference in each case for their group.

In the third partial measurement C, each of the two groups from the partial measurement B are again divided in the center, so that four groups of sensor elements result. Here as well, a difference value is again generated for each group at read-out by reading out positively the measurements from one half of the sensor elements belonging to that particular group, while reading out negatively the measurements belonging to the other half of the sensor elements of that group. Thus four difference values are obtained for the four groups.

Further partial measurements are made subsequent to the procedure described, in which the groups continue to be halved with respect to the previous partial measurement for each partial measurement, so that the number of difference values read out constantly increases for later partial measurements, i.e. more detailed information about the image to be recorded is provided. A recursive structure to the partial measurements hence results.

The maximum number of partial measurements that can be made is when all directly adjacent sensor elements are each alternately added and subtracted, i.e. read out positively and negatively.

In practice, however, the measurement can be stopped early by group or in total, namely when a required level of resolution is reached.

The maximum measurement time per partial measurement is also inversely proportional to the area connected together in each case. This means that for the first partial measurement A, only a very short exposure is required, which increases for the later partial measurements. Thus time can be saved on the overall measurement by prompt termination of the sequence of partial measurements when a required resolution is reached. This is done by starting with the partial measurement A, which requires the shortest measurement time, and then ordering the partial measurements so that the measurement times increase in the order of the partial measurements. A more general and even more important time saving in the context of the invention, however, results from the fact that the partial measurements for the individual groups decouple, i.e. become independent of each other, when a suitable basis is chosen. This effect is explained in detail below with reference to FIG. 4.

Overall the maximum measurement times are summed according to the harmonic series, so that the maximum overall measurement time remains equal to the measurement time that would be required for a conventional recording. The switching times needed to add and subtract the sensor elements in the manner explained are also added onto this time however.

For a normal image recording it is sufficient to start with a partial measurement A as in the exemplary embodiment described, in which the measurements of the one half of sensor elements 1 to 8 are added by connecting in parallel, and the measurements of the other half of sensor elements 9 to 16 are subtracted by connecting in parallel with the opposite polarity. In normal image recordings it is in fact only relative brightness levels that matter. If, however, an absolute measurement is to be made, then an additional partial measurement needs to be switched in before or afterwards, in which the measurements of all the sensors are added together, thus measuring the total intensity of the image to be recorded.

Figure 2:
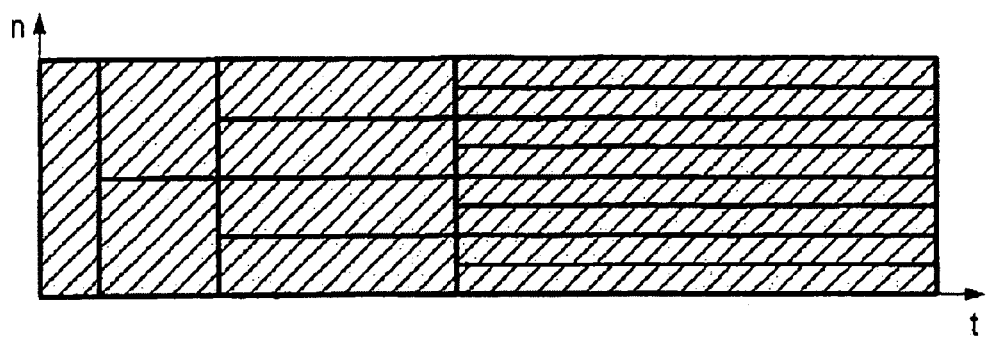
FIGS. 2 to 4 are timing diagrams for the switching over time of sensor elements of the one-dimensional sensor device of FIG. 1 combined in groups.

The measurement times for the sensor elements 1 to 16 are shown in FIG. 2 in an example measurement. The measurement times are obtained from the formula $$\Delta t_j^i = C \cdot (I_j^i)^{-1}.$$

Figure 3:
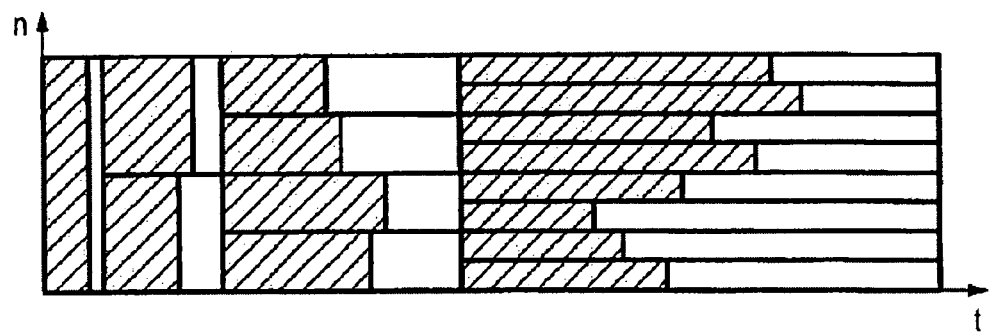
Figure 4:
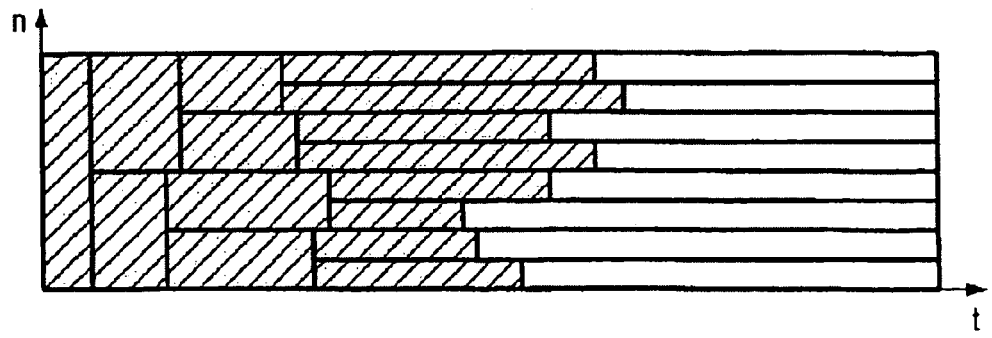

FIGS. 2 to 4 show the measurement times for the groups of sensor elements 1 to n for the respective partial measurements. FIG. 2 shows the course of measurements over time for the individual groups when the maximum measurement time is always required for each partial measurement.

In practice, however, the measurement times for the partial measurements reduce when these are terminated after a sufficient time period. This is shown in FIG. 3. To do this, the required measurement times for each of the partial measurements are found by a measurement-time measurement. For the case where the sensor device is a CCD arranged in a camera, this is done according to the following principle for example: the light incident on the CCD generates a current that charges the capacitances contained in the CCD. The degree of charge of the capacitances is measured in a defined timing cycle. When the capacitances of a group in a partial measurement are sufficiently charged, the measurement time for this group is stopped and the partial measurement for the group terminated. This results in the reductions in the overall measurement time shown in FIG. 3.

The procedure illustrated in FIG. 4 now also makes use of the effect that the partial measurements for the individual groups decouple, i.e. become independent of each other, when a suitable basis is chosen. For this reason, one does not need to wait before starting the partial measurement of a group until all the partial measurements have finished that are one level up in the hierarchy of the recursive series of partial measurements than the partial measurement to be made, but it is sufficient at each point in time, and for each partial measurement of a group, if the partial measurement has finished for the group from which the group to be measured in the recursive sequence originates. Hence each of the partial measurements can generally be started earlier, and one obtains the desynchronized, interleaved sequence shown in FIG. 4, which leads to a considerable reduction in the overall measurement time.

Figure 5:
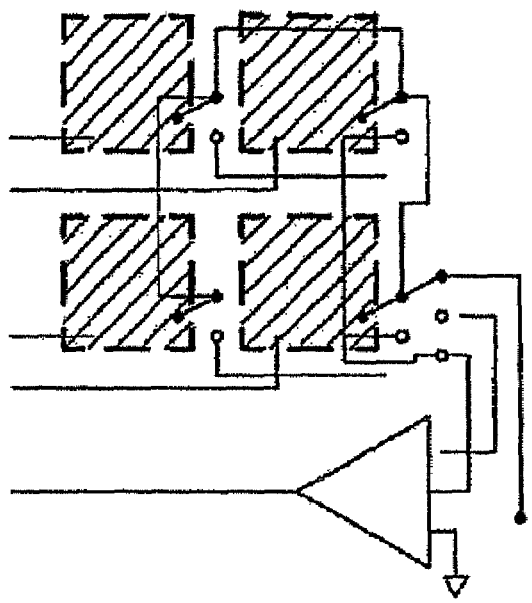
FIG. 5 is a circuit diagram of a two-dimensional sensor arrangement.

FIG. 5 shows a circuit diagram for four groups of sensor elements with read-out unit. In order to generate a complete Haar wavelet basis, the following measurements are read out in the form of output voltages in successive partial measurements:

$$I_0 = i_1 + i_2 + i_3 + i_4,$$

$$I_1 = i_1 + i_2 - i_3 - i_4,$$

$$I_2 = i_1 - i_2 + i_3 - i_4,$$

$$I_3 = i_1 - i_2 - i_3 + i_4,$$

where $I_m$, m=0, . . . 3, is the difference value of the partial measurement m, i.e. gives the value of the basis vector measured for the respective partial measurement m, and $i_n$, n=1, . . . , n, is the measurement of the group n of sensor elements.

Figure 6:
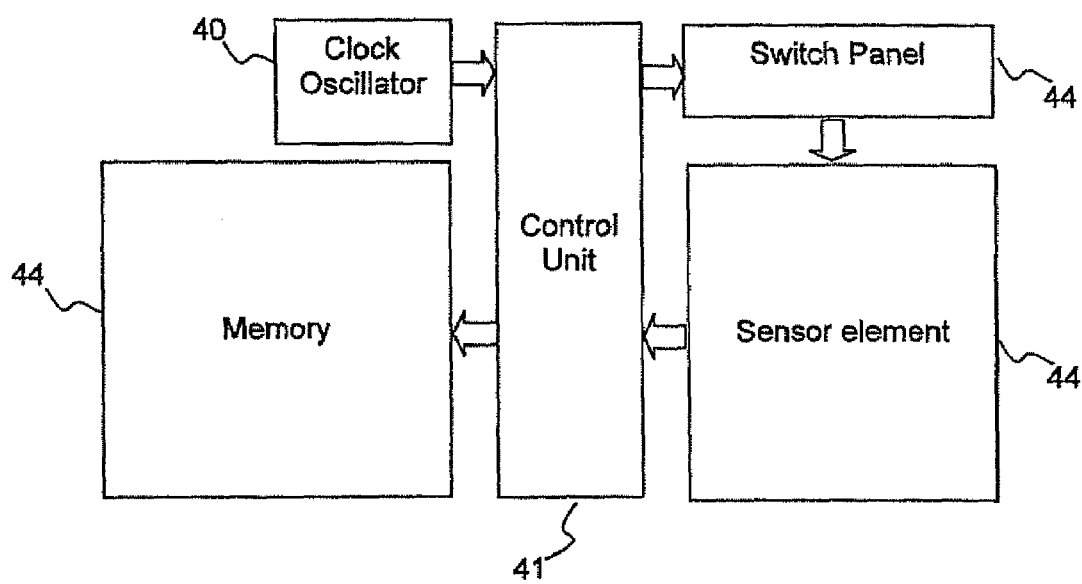
FIG. 6 is a block diagram of a sensor device in the general case.

FIG. 6 shows in a block diagram the basic design of the sensor arrangement. The sensor device contains a clock oscillator 40 that defines the timing of a control unit 41 that controls a switch panel 42 in order to read the sensor elements 43. Control unit 41 and switch panel 42 are part of the read-out unit. The difference values obtained are saved in a memory 44 in the form of a DRAM.

In the exemplary embodiments shown so far, the measurements from the sensor elements are added and subtracted in such a way that the difference values obtained gave the values of the basis vectors of the Haar basis of a wavelet transformation. Alternatively, the measurements from the sensor elements may also be added and subtracted together so as to obtain the values of the basis vectors of a Daubechies, Gabor and/or other basis. The circuitry is more complicated in this case, and the measurements cannot be added and subtracted directly, but need to be given prefactors at read-out. In their favor, the Daubechies and/or Gabor bases are particularly suited to many image processing applications, and they can be used to achieve a higher compression rate than is possible with the Haar basis.

The exemplary embodiments described are suitable for making an intensity measurement. If a color measurement is to be made, then three recordings for the three primary colors can be made in the way known in the art, or the color may be separated in another way. There is absolutely no need to use the same basis and resolution for each color here.

The sensor device and the associated method are suitable in particular for the production of x-ray photographs, for remote sensing and astrophysics applications and for digital photography.

In general, the following advantages are obtained:

The total measurement time need not be set in advance. The maximum resolution can always be obtained by a sufficiently long measurement time. Overexposure effects do not arise here.

The measurement time can be optimized during exposure according to the location.

A low-resolution image, which means a very short recording time, can be subsequently further exposed locally without loss.

Theoretically the recording rate can be as fast as required. The same hardware can be used for different environments.

The image information is present in compact form, in particular in the form of wavelet coefficients. This means a low memory requirement and a good basis for further data processing such as compression.

Where blurring occurs during part of the measurement time or where recording has stopped prematurely, the image is never completely unusable.

A drastically reduced measurement time is obtained if only a low resolution is required.

If the read-out unit is designed so that the read-out of the measurements from the sensor elements can be controlled according to the application by suitable programming, the (wavelet) basis that suits the application can be applied using a sensor device that does not change in the hardware.

The invention has been described in detail with particular reference to preferred embodiments thereof and examples, but it will be understood that variations and modifications can be effected within the spirit and scope of the invention.

The invention claimed is:

1. A sensor device to perform an overall measurement, comprising:
   sensor elements making measurements; and
   a read-out unit reading partial measurements from said sensor elements in succession by at least one of adding and subtracting measurements of different sensor elements to obtain the partial measurements, so that values of basis vectors are obtained for a basis in which the overall measurement can be represented.

2. The sensor device as claimed in claim 1, wherein the basis is the basis of a wavelet transformation.

3. The sensor device as claimed in claim 2, wherein the basis is a Haar basis.

4. The sensor device as claimed in claim 3, wherein the measurement values of at least some of the sensor elements are provided with prefactors when adding and subtracting.

5. The sensor device as claimed in claim 4, wherein the basis is one of a Daubechies and a Gabor basis.

6. The sensor device as claimed in claim 5, wherein said sensor elements record spatially distributed measurements of an image.

7. The sensor device as claimed in claim 6, wherein said sensor elements are in a charge coupled device.

8. The sensor device as claimed in claim 7, wherein the sensor device includes at least 16 of said sensor elements.

9. The sensor device as claimed in claim 8, wherein said read-out unit makes at least 3 partial measurements.

10. The sensor device as claimed in claim 9, wherein said read-out unit adds a first number of measurements approximately equal to a second number of measurements that are subtracted.

11. The sensor device as claimed in claim 9, wherein said read-out unit obtains the partial measurements by forming groups of said sensor elements in which the measurements of grouped sensor elements are added and subtracted.

12. The sensor device as claimed in claim 11, wherein said read-out unit stops obtaining partial measurements once a required resolution is reached.

* * * * *